(12) United States Patent
Haldeman et al.

(10) Patent No.: US 11,518,506 B2
(45) Date of Patent: Dec. 6, 2022

(54) PRECISION BLADE PITCH ADJUSTMENT

(71) Applicant: Bell Textron Inc., Fort Worth, TX (US)

(72) Inventors: Andrew Paul Haldeman, Fort Worth, TX (US); Michael Seifert, Southlake, TX (US); Timothy McClellan Mosig, Richland Hills, TX (US); Aaron Acee, Flower Mound, TX (US); Diana R. Tinlin, Fort Worth, TX (US); Andrew Thomas Carter, Richland Hills, TX (US); Glenn Thornton Lancaster, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/198,007

(22) Filed: Mar. 10, 2021

(65) Prior Publication Data
US 2022/0289368 A1 Sep. 15, 2022

(51) Int. Cl.
| | | |
|---|---|---|
| *F04D 29/36* | (2006.01) | |
| *B64C 27/59* | (2006.01) | |
| *F01D 7/00* | (2006.01) | |
| *F01D 5/30* | (2006.01) | |
| *F01D 5/02* | (2006.01) | |
| *B64C 11/06* | (2006.01) | |
| *F04D 29/32* | (2006.01) | |

(52) U.S. Cl.
CPC ............. *B64C 27/59* (2013.01); *F01D 5/02* (2013.01); *F01D 5/30* (2013.01); *F01D 7/00* (2013.01); *B64C 11/065* (2013.01); *F04D 29/329* (2013.01); *F04D 29/36* (2013.01); *F04D 29/364* (2013.01); *F05D 2220/90* (2013.01); *F05D 2260/70* (2013.01); *F05D 2260/83* (2013.01)

(58) Field of Classification Search
CPC ....... B64C 11/04; B64C 11/06; B64C 11/065; B64C 11/30; B64C 11/32; B64C 27/78; B64C 27/48; B64C 27/59; B64C 2027/8209; B64C 2027/8254; F04D 29/34; F04D 29/36; F04D 29/364; F01D 7/00; F01D 7/02
See application file for complete search history.

(56) References Cited

U.S. PATENT DOCUMENTS

| | | | | |
|---|---|---|---|---|
| 1,869,182 A | * | 7/1932 | Blanchard | ............. B64C 11/065 |
| | | | | 416/61 |
| 2,109,696 A | * | 3/1938 | Hackethal | ............... B64C 11/06 |
| | | | | 416/147 |
| 2,307,490 A | * | 1/1943 | Curley | .................. F04D 29/362 |
| | | | | 415/207 |

(Continued)

*Primary Examiner* — Richard A Edgar
*Assistant Examiner* — Behnoush Haghighian
(74) *Attorney, Agent, or Firm* — Shackelford, Bowen, McKinley & Norton, LLP

(57) ABSTRACT

A blade pitch adjustment mechanism includes a pitch cylinder having a first face and pitch slots extending longitudinally from the first face, a blade sleeve having a second face and a blade slot extending longitudinally from the second face, the blade sleeve is configured to be rotationally positioned in the pitch cylinder with the second face located with the first face, wherein the blade slot and the pitch slots are cooperative to form keyway, corresponding to a discrete blade pitch, when the blade slot is aligned with a pitch slot.

16 Claims, 9 Drawing Sheets

(56) References Cited

U.S. PATENT DOCUMENTS

| | | | | |
|---|---|---|---|---|
| 2,381,284 A * | 8/1945 | Heath | ............... | B64C 11/06 29/889.6 |
| 4,600,362 A * | 7/1986 | Vostermans | ............ | F04D 29/34 416/208 |
| 5,611,665 A * | 3/1997 | Angel | ............... | B63H 3/002 416/209 |
| 7,214,035 B2 * | 5/2007 | Bussieres | ............... | F01D 5/025 416/207 |
| 7,878,764 B2 * | 2/2011 | Dakhoul | ............... | F04D 29/329 416/214 R |
| 2009/0028709 A1 * | 1/2009 | Dakhoul | ............... | F04D 29/36 416/153 |

* cited by examiner

PRECISION BLADE PITCH ADJUSTMENT

STATEMENT REGARDING FEDERALLY SPONSORED RESEARCH OR DEVELOPMENT

This invention was made with government support under Agreement No. W911W6-19-9-0002, awarded by the U.S. Army Contracting Command-Redstone Arsenal. The government has certain rights in the invention.

TECHNICAL FIELD

This disclosure relates in general to the field of aircraft, and more particularly, but not by way of limitation, to mechanisms and method for precision adjusting and fixing of blade pitch in rotor blade assemblies.

BACKGROUND

This section provides background information to facilitate a better understanding of the various aspects of the disclosure. It should be understood that the statements in this section of this document are to be read in this light, and not as admissions of prior art.

Testing of rotor performance requires adjustment of rotor blade pitch to a variety of angles with a high degree of precision. This requires blade pitch adjustment setup and measurement at each pitch angle. Depending on the configuration of the rotor hub, e.g., number of blades, the pitch adjustment process can account for a considerable portion of time during the testing phase. A typical blade pitch is adjusted by aligning index marks between the blade and the hub for a rough pitch setting. The rough pitch setting is refined by measuring and adjusting the blade pitch with an inclinometer that is temporarily clamped to the blade.

SUMMARY

An exemplary blade pitch adjustment mechanism includes a pitch cylinder having a first face and pitch slots extending longitudinally from the first face, a blade sleeve having a second face and a blade slot extending longitudinally from the second face, the blade sleeve is configured to be rotationally positioned in the pitch cylinder with the second face located with the first face, wherein the blade slot and the pitch slots are cooperative to form keyway, corresponding to a discrete blade pitch, when the blade slot is aligned with a pitch slot.

An exemplary rotor blade assembly including a hub having a rotational axis and an outboard wall parallel to the rotational axis, a pitch cylinder fixed to the hub and extending inboard with a first face exposed at the outboard wall, pitch slots spaced circumferentially and extending inboard from the first face, a blade sleeve fixed to a blade and positioned in the pitch cylinder with a second face located at the outboard wall, a blade slot extending inboard from the second face, wherein the blade slot is cooperative with each pitch slot of the pitch slots to form a keyway when the blade slot is aligned with the each pitch slot, and a key configured to be disposed in the keyway thereby fixing the blade sleeve to the pitch cylinder.

An exemplary method includes using a blade pitch adjusting mechanism to adjust a blade pitch, rotating the blade sleeve until the blade slot is aligned with a first pitch slot of the pitch slots forming a first keyway corresponding to a first blade pitch, and fixing the blade at the first blade pitch by positioning a key in the first keyway.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
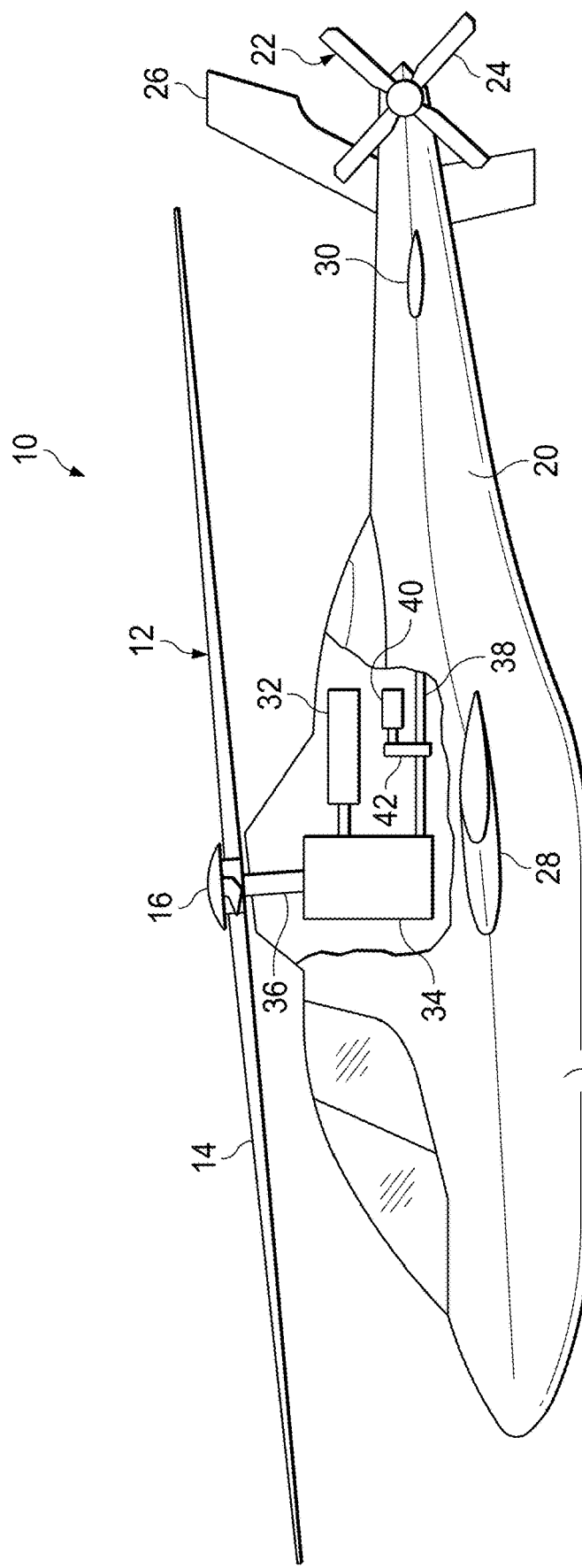
FIG. 1 illustrates an exemplary rotorcraft that can implement the precision blade pitch adjustment mechanism.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

Referring to FIG. 1, a rotorcraft in the form of a helicopter is schematically illustrated and generally designated 10. The primary propulsion assembly of helicopter 10 is a main rotor assembly 12. Main rotor assembly 12 includes a plurality of rotor blades 14 extending radially outward from a main rotor hub 16. Main rotor assembly 12 is coupled to a fuselage 18 and is rotatable relative thereto. The pitch of rotor blades 14 can be collectively and/or cyclically manipulated to selectively control direction, thrust, and lift of helicopter 10. A tailboom 20 is coupled to fuselage 18 and extends from fuselage 18 in the aft direction. An anti-torque system 22 includes a tail rotor assembly 24 coupled to an aft end of tailboom 20. Anti-torque system 22 controls the yaw of helicopter 10 by counteracting the torque exerted on fuselage 18 by main rotor assembly 12. In the illustrated embodiment, helicopter 10 includes a vertical tail fin 26 that provides stabilization to helicopter 10 during high-speed forward flight. In addition, helicopter 10 includes wing members 28 that extend laterally from fuselage 18 and wing members 30 that extend laterally from tailboom 20. Wing members 28, 30 provide lift to helicopter 10 responsive to the forward airspeed of helicopter 10, thereby reducing the lift requirement on main rotor assembly 12 and increasing the top speed of helicopter 10.

Main rotor assembly 12 and tail rotor assembly 24 receive torque and rotational energy from a main engine 32. Main engine 32 is coupled to a main rotor gearbox 34 by suitable clutching and shafting. Main rotor gearbox 34 is coupled to main rotor assembly 12 by a mast 36 and is coupled to tail rotor assembly 24 by tail rotor drive shaft 38. In the illustrated embodiment, a supplemental engine 40, or supplemental power unit, is coupled to tail rotor drive shaft 38 by a supplemental engine gearbox 42 that provides suitable clutching therebetween.

Rotorcraft 10 is merely illustrative of a variety of aircraft that can implement the embodiments disclosed herein. Other aircraft implementations can include hybrid aircraft, tiltwing aircraft, tiltrotor aircraft, quad tiltrotor aircraft, unmanned aircraft, gyrocopters, propeller-driven airplanes, compound helicopters, drones, and the like. As such, those skilled in the art will recognize that the precision blade pitch adjustment mechanism of the present disclosure can be integrated into a variety of aircraft configurations. It should be appreciated that even though aircraft are particularly well-suited to implement the embodiments of the present disclosure, non-aircraft vehicles and devices can also implement the embodiments.

Figure 2:
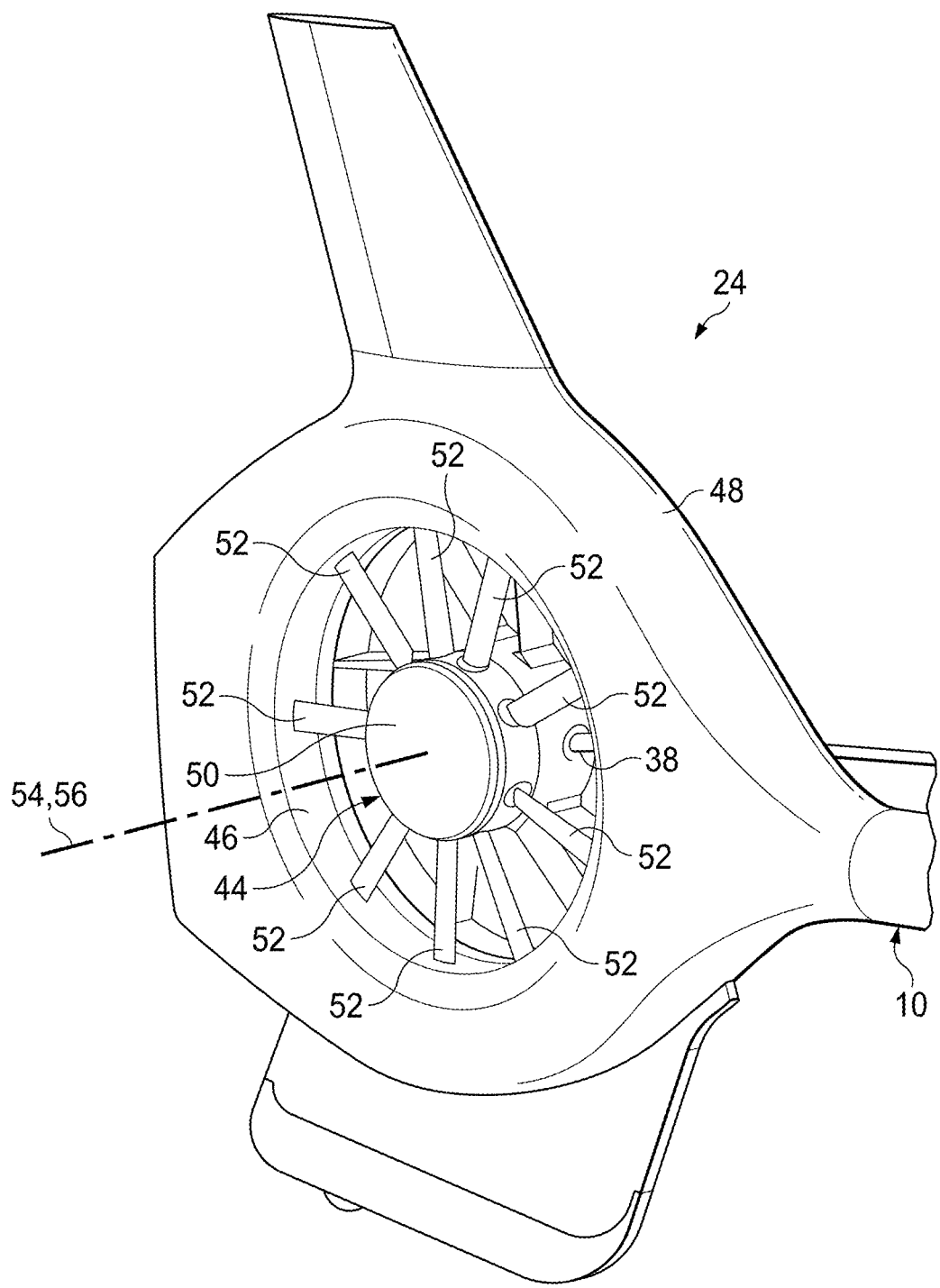
FIG. 2 illustrates an exemplary rotor blade assembly can implement the precision blade pitch adjustment mechanism.
Figure 3:
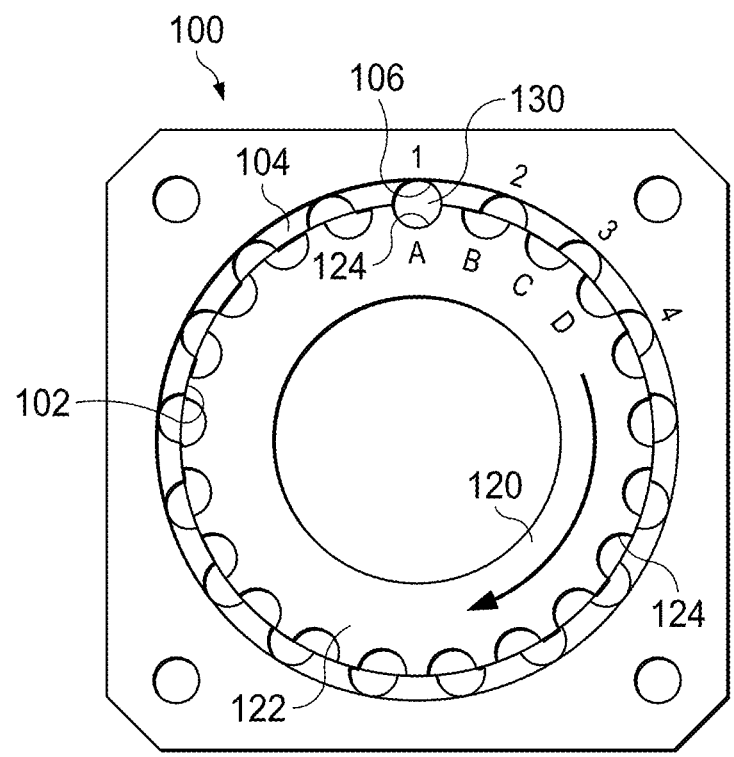
FIG. 3 illustrates a front view of an exemplary precision blade pitch adjustment mechanism.

FIG. 2 illustrates an exemplary anti-torque tail rotor assembly 24 implementing a precision glade pitch adjustment mechanism. In this embodiment, tail rotor assembly 24 is a ducted fan with fixed pitched blades. The ducted fan 24 includes a rotor 44 mounted within a duct 46 that extends through a shroud 48 of a tail portion of rotorcraft 10. Rotor 44 is rotatably mounted within duct 46 and includes a hub 50 and a plurality of blades 52. Rotor 44 may include any suitable number of blades 52, e.g., nine blades, as illustrated in FIG. 2. Hub 50 is rotatable about a rotational axis 54 that is coaxial with a central axis 56 of duct 46. Blades 52 extend radially from hub along a pitch change axis.

Referring now to FIGS. 3-6, an exemplary precision blade pitch adjustment mechanism 100 for fixing a rotor blade to a rotor hub is illustrated. Mechanism 100 includes a pitch cylinder 102 that is configured to be fixed to a rotor hub and a blade sleeve 120 that is configured to be fixed to a rotor blade and rotationally positioned in pitch cylinder 102.

Pitch cylinder 102 has a cylinder front face 104 and one or more pitch slots, generally designated 106, that extend longitudinally from cylinder front face 104. In an exemplary embodiment, pitch slot 106 extends from front face 104 to a rear face 105 of the pitch cylinder. Pitch cylinder 102 has an internal surface 108 with an inside diameter 108a defining a bore 110. In this embodiment, pitch cylinder 102 includes a plate 112 that circumscribes the front face. Plate 112, in this example, is configured to secure pitch cylinder 102 to a rotor hub. Cylinder front face 104 may be recessed in bore 110.

Figure 4:
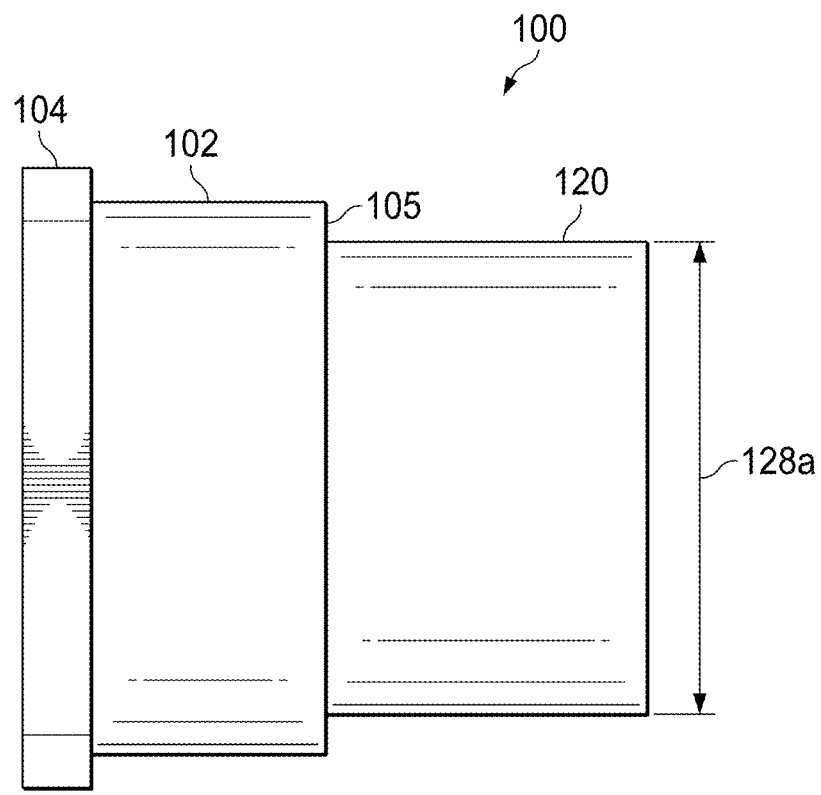
FIG. 4 illustrates a side view of an exemplary precision blade pitch adjustment mechanism.
Figure 5:
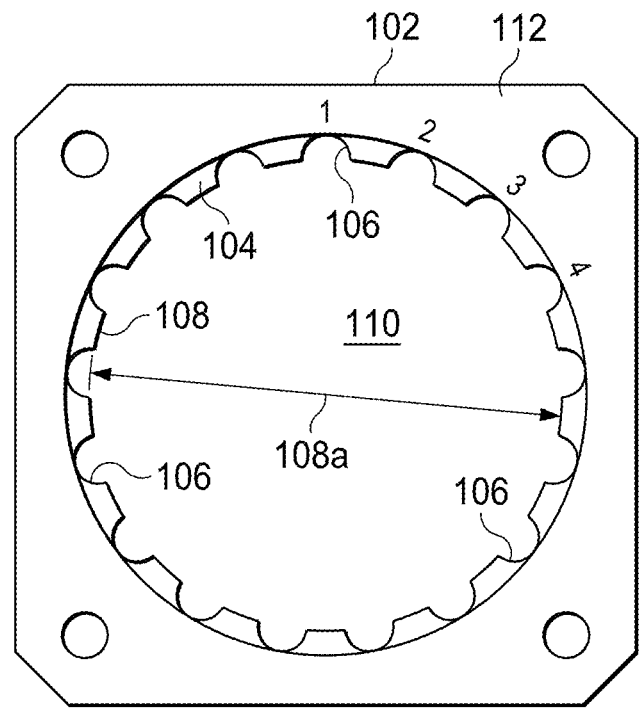
FIG. 5 is a front view of an exemplary pitch cylinder of a precision blade pitch adjustment mechanism.
Figure 6:
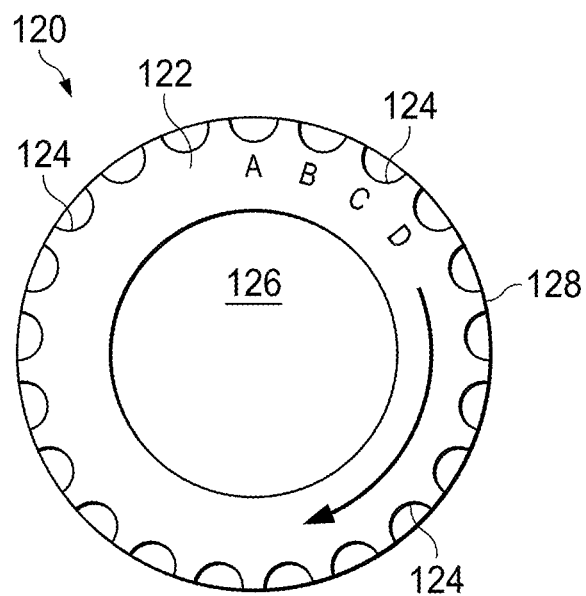
FIG. 6 is a front view of an exemplary blade sleeve of a precision blade pitch adjustment mechanism.

With reference in particular to FIGS. 4 and 6, blade sleeve 120 has a sleeve front face 122 and one or more blade slots, generally designated 124, that extend longitudinally from sleeve front face 122. Blade sleeve 120 has an internal bore 126 for disposing a portion of the rotor blade, e.g., a root end, and an outer surface 128 having an outside diameter 128a.

In use, blade sleeve 120 is disposed in pitch cylinder 102, with cylinder front face 104 and sleeve front face 122 located together. For example, the front face may be co-planar or one face may be forward and overlapping some or all of the other face, e.g., sleeve front face 122 overlapping cylinder face 104.

Figure 10:
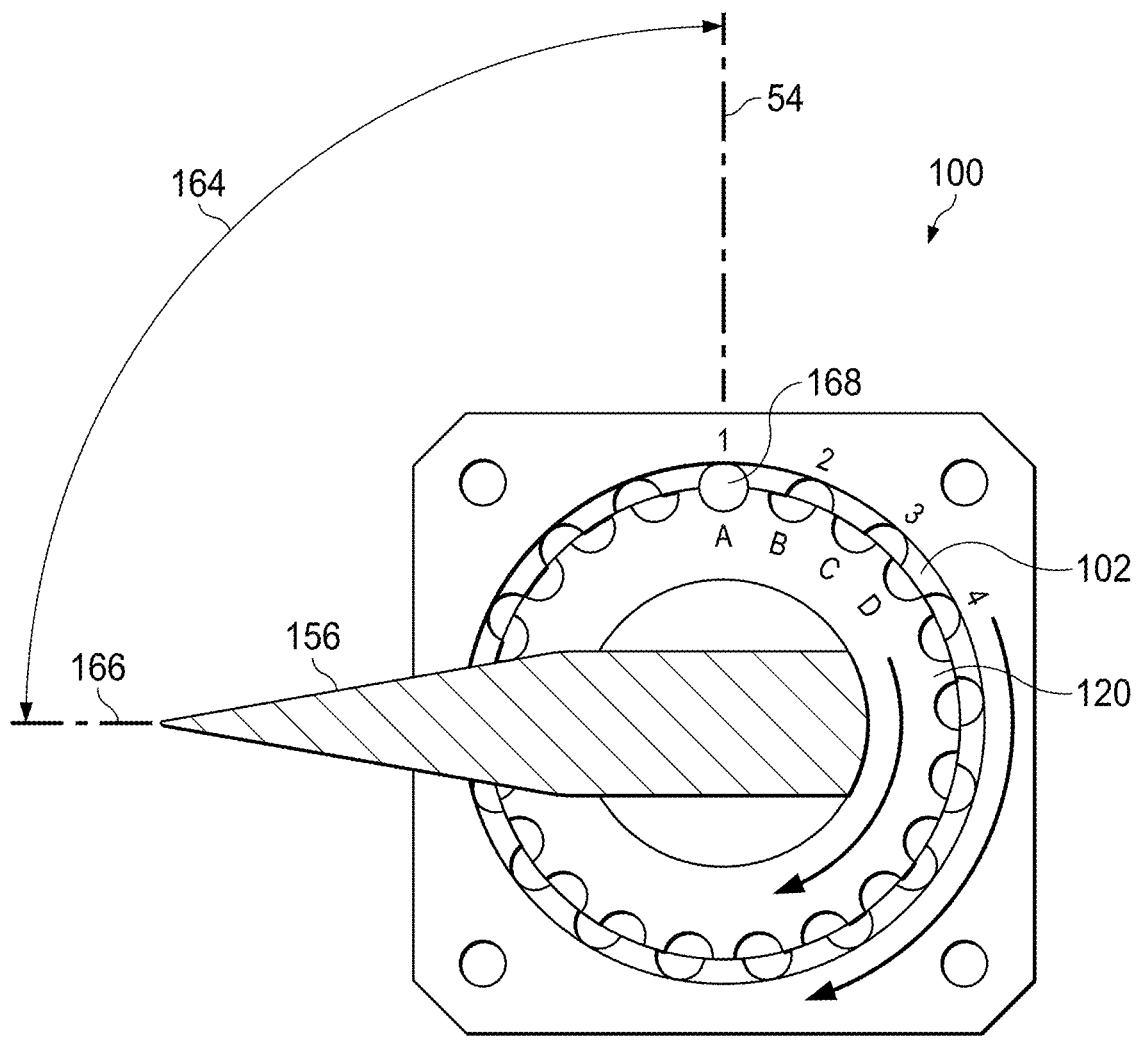
FIG. 10 is a view along the line 10-10 of FIG. 7.

Pitch slots 106 and blade slots 124 have cooperative shapes such that when a pitch slot 106 and a blade slot 124 are circumferentially aligned they form a keyway 130 in which a key 168, see, e.g., FIG. 10, can be inserted fixing blade sleeve 120 with pitch cylinder 102. In the exemplary embodiments, pitch slots 106 are formed in internal surface 108, however, they may be formed so as not to be open at the internal surface. Similarly, blade slots 124 are formed in outer surface 128.

Each keyway 130 corresponds to a pre-determined discrete blade pitch. Accordingly, the number and circumferential orientation of the slots can be selected for the desired adjustment fidelity. For example, the mechanism may have a single one of either the blade slot or the pitch slot and a plurality of the other one of the blade slot or the pitch slot. There may be a plurality of blade slots and a plurality of pitch slots. The illustrated exemplary embodiment has seventeen pitch slots 106 and twenty-one blade slots 124 providing an adjustment fidelity of approximately 1 degree. Accordingly, the keyways 130 are circumferentially located at increments of about 1-degree. Keyways 130 may be circumferentially located at increments in the range, for example, of about 0.5 to about 1.5 degrees. Keyways 130 may be circumferentially located at increments in the range, for example, of about 0.8 to about 1.2 degrees. Keyways 130 may be circumferentially located at increments less than 0.5 degrees or greater than 1.5 degrees. Each of the pitch slots 106 and the blade slots 124 can be marked with a code, e.g., alphanumeric code, and a table can list the blade pitch angle for each keyway 130. For example, keyway 130 in FIG. 3 corresponds to a 0-degree pitch angle, identified by code "A1." Code "A1" corresponds to blade slot "A" being aligned with pitch slot "1."

Figure 7:
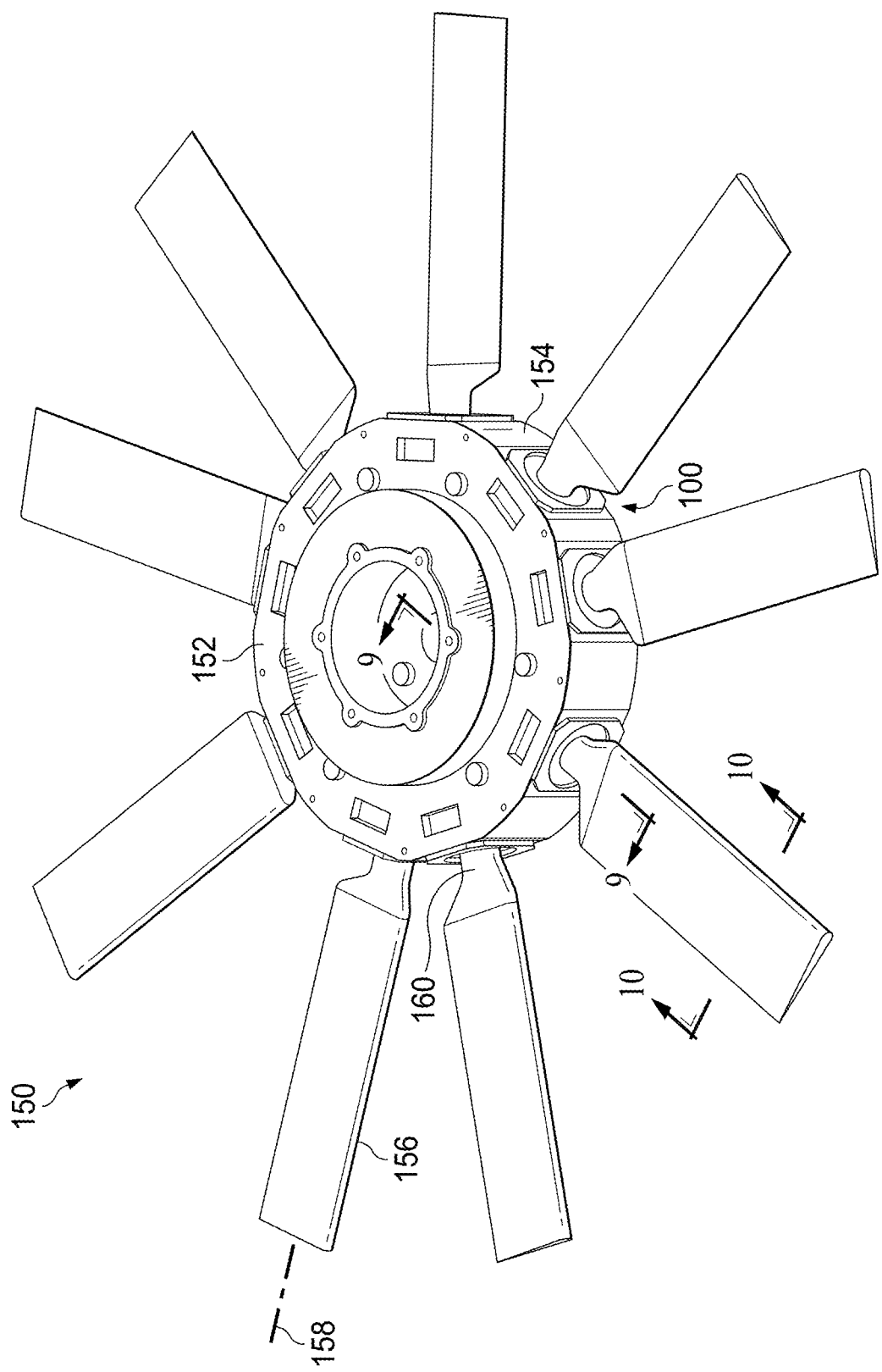
FIG. 7 a precision blade pitch adjustment mechanism implemented in a rotor blade assembly.

FIG. 7 illustrates an exemplary rotor blade assembly 150 implementing precision blade pitch adjustment mechanism 100, which is described with reference to the other figures. Rotor blade assembly 150 includes a hub 152 having a rotational axis 54 (FIGS. 2 and 10) and an outerwall 154 parallel to the rotational axis. Rotor blades 156 extend radially from hub 152. Each rotor blade extends along a pitch change axis 158. Rotor blade 156 is attached to the blade sleeve, for example, at root end 160 to rotate with the blade sleeve of precision blade pitch adjustment mechanism 100.

Figure 8:
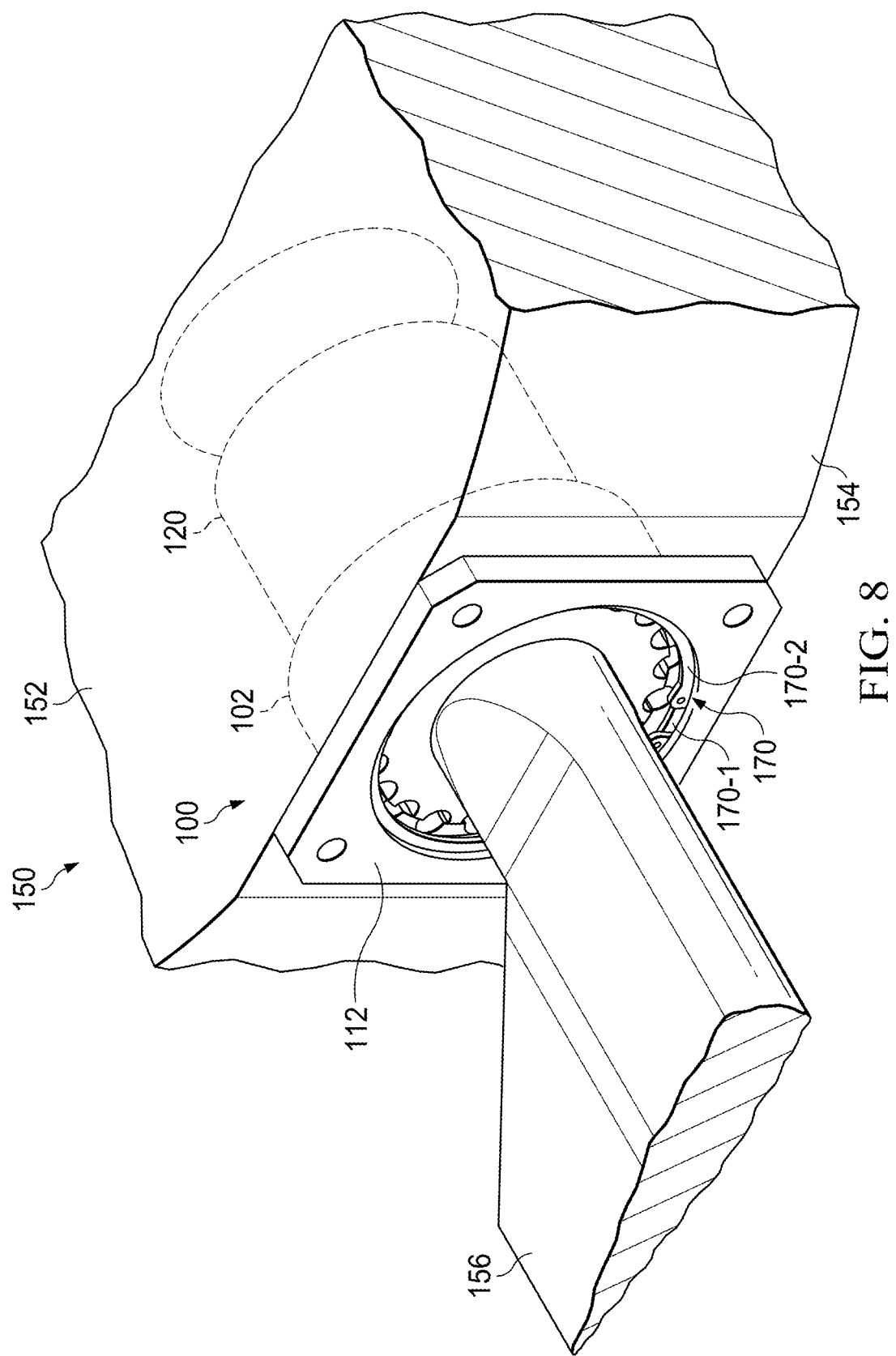
FIG. 8 is an expanded illustration of an exemplary blade pitch adjustment mechanism in the rotor blade assembly of FIG. 7.
Figure 9:
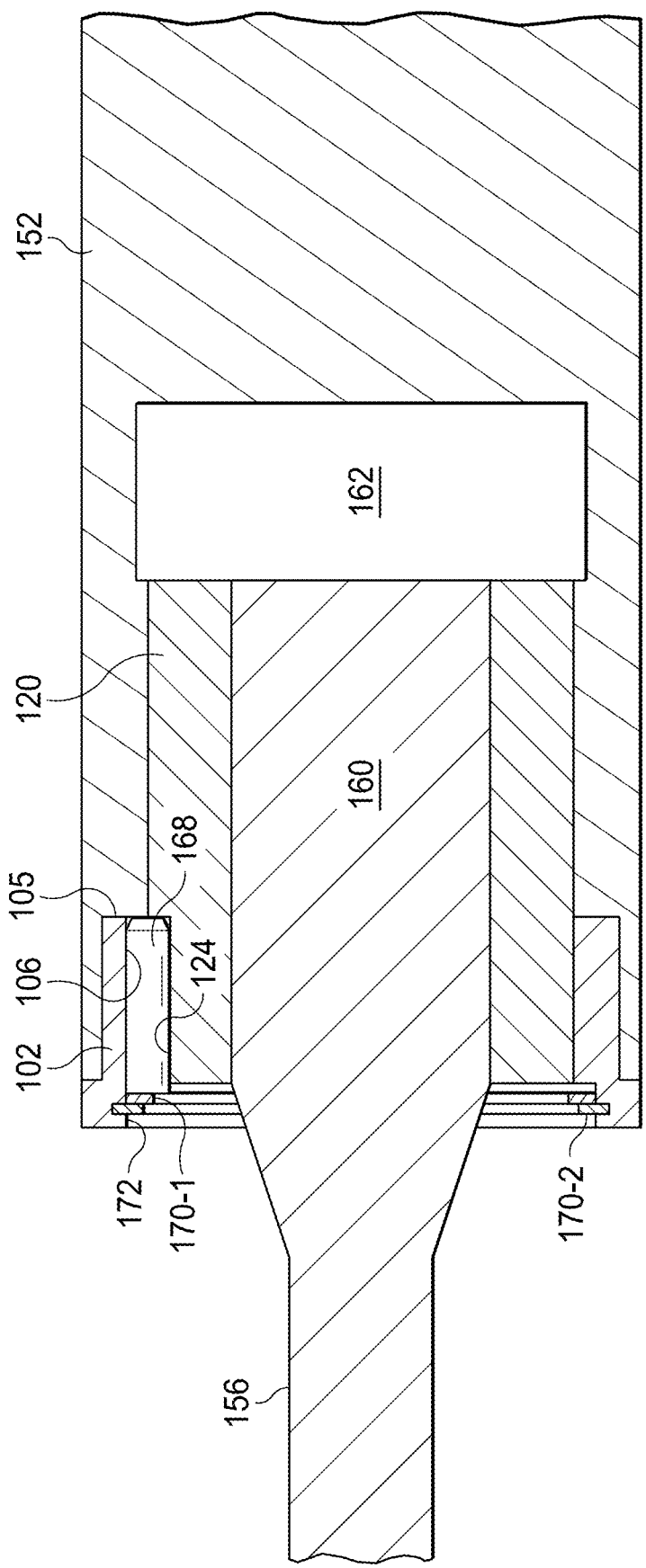
FIG. 9 is a view along the line 9-9 in FIG. 7.

With additional reference to FIGS. 8-10, the connection of blade pitch adjustment mechanism 100, blade 156, and hub 152 is described. Pitch cylinder 102 is fixedly secured to hub 152 at outerwall 154 and extends into hub 152. Pitch cylinder 102 may be secured to hub 152, for example, by bolting or welding at plate 112. Pitch cylinder front face 104 is exposed at the outerwall so that it can be accessed by personnel.

Blade 156 is fixedly secured to blade sleeve 120 with root end 160 disposed in the bore of blade sleeve 120. Root end 160 and blade 156 are axially secured to hub 152 by a centrifugal force (CF) retention component 162. CF retention component 162 may be accomplished by various components, including without limitation a rib and groove joint or a link. The blade pitching moment during rotation may be reacted by the key positioned in the keyway and/or by a another pitch retention mechanism. For example, hub 152 may be clamped along the axis perpendicular to the rotation axis of the blades, e.g., parallel to faces 102, 104, thereby clamping hub 152 plates with blade sleeve 120 to retain the pitch angle position.

Figure 11:
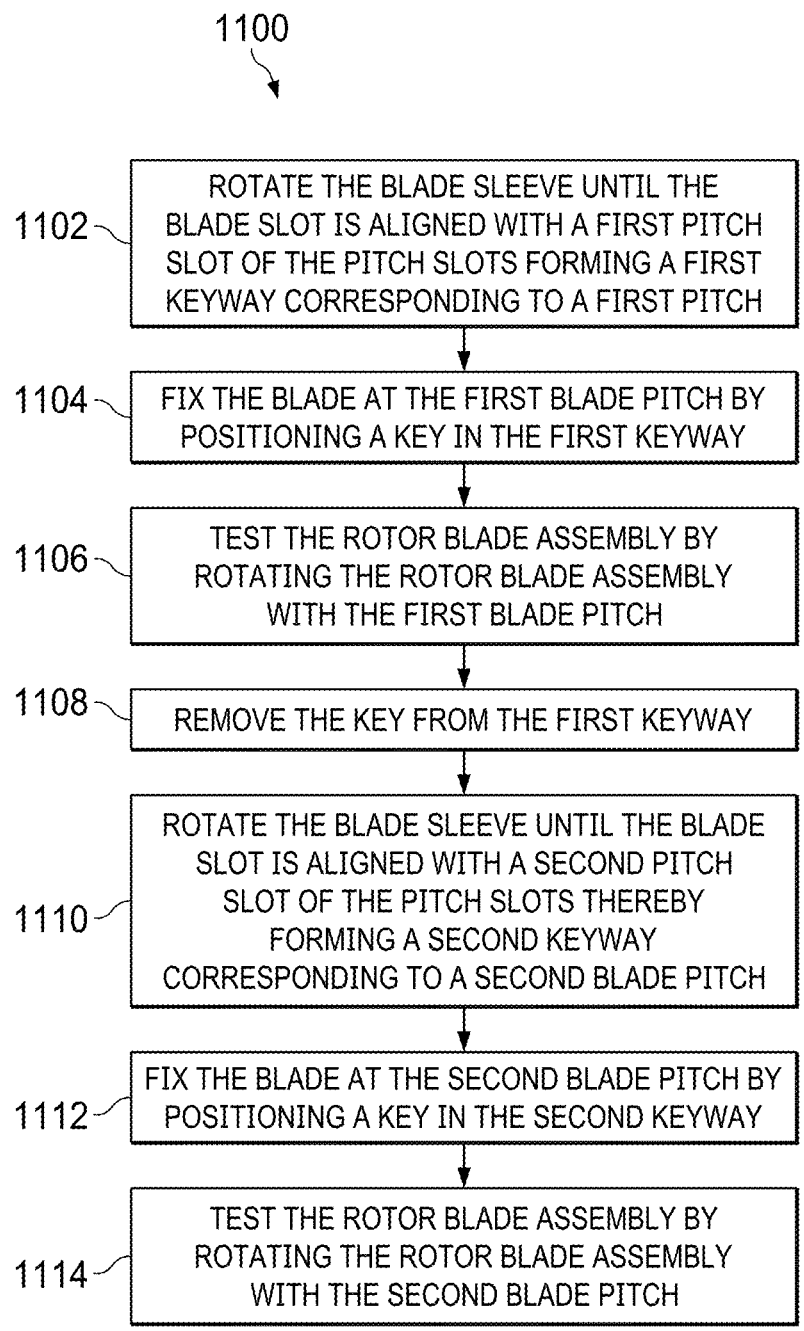
FIG. 11 is a flow diagram of an exemplary method.

FIG. 11 illustrates an exemplary method 1100 for adjusting a blade pitch of rotor blade assembly using rotor blade pitch adjustment mechanism 100. A blade pitch 164 is generally shown in FIG. 10 as the angle 164 between rotational axis 54 and the plane of rotation 166 of rotor blade 156.

At block 1102, blade sleeve 120 and blade 156 are rotated until a blade slot 124 is aligned with a pitch slot 124 forming a keyway 130 corresponding to a first blade pitch 164. It may be desired, for example, for the first blade pitch to be 0-degrees. Personnel may reference a lookup table identifying blade slot and pitch slot combination with corresponding blade pitch angles. For example, a 0-degree blade pitch corresponds to a keyway 130 formed by the slots "A1," which is the combination of a blade slot 124, identified as "A," with a pitch slot 106 identified "1," At block 1104, blade 156 fixed at the first blade pitch 164 by positioning a key 168 in the first keyway 130. Hub 152 may be clamped, e.g., via bolts, against the outer diameter of blade sleeve 120. The friction between blade sleeve 120 and hub 152, e.g., top and bottom hub plates, may provide the primary blade pitch moment reaction load path.

In an embodiment key 168 is secured in keyway 130 for example by a stop 170 against axial movement when the assembly rotates. Stop 170 may take several forms. For example, stop 170 may be plate and/or spring clip, e.g., circle-clip. In FIGS. 8 and 9, two components, a plate 170-1 and a spring clip 170-2, are used as the stop. In the illustrated embodiment, stop 170 may be positioned in the recess 172 of plate 112 where pitch front face 104 is recessed. At block 1106, the rotor blade assembly is tested by rotating the assembly at the first blade pitch. At block 1108, the key is removed from the first keyway so that the blade pitch can be changed. At block 1110, the blade sleeve is rotated until a blade slot is aligned with a pitch slot forming a second keyway corresponding to a second blade pitch. At block 1112, the blade is fixed at the second blade pitch and the rotor assembly is tested at block 1114. Although the method is described with reference to adjusting a single blade, it is understood that the rotor assembly will have more than one blade, for example 6 or more blades. In an exemplar embodiment, the rotor assembly has 9 blades. Each blade has to be set at a discrete blade pitch angle to test the rotor.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A blade pitch adjustment mechanism for fixing a rotor blade to a rotor hub, the blade pitch adjustment mechanism comprising:
   a pitch cylinder having a first face and pitch slots extending longitudinally from the first face, and a pitch plate circumscribing the first face, wherein the first face is recessed inboard from the pitch plate;
   a blade sleeve having a second face and a blade slot extending longitudinally from the second face, the blade sleeve configured to be rotationally positioned in the pitch cylinder with the second face located with the first face; and the blade slot is cooperative with each pitch slot of the pitch slots to form keyways, whereby a keyway of the keyways is opened at the each pitch slot when the blade slot is circumferentially aligned with the each pitch slot.

2. The blade pitch adjustment mechanism of claim 1, wherein the blade slot comprises blade slots.

3. The blade pitch adjustment mechanism of claim 1, wherein the keyways are circumferentially located at increments of about 1 degree.

4. The blade pitch adjustment mechanism of claim 1, wherein the keyways are circumferentially located at increments of about 0.08 and 1.2 degrees.

5. The blade pitch adjustment mechanism of claim 1, wherein the keyways are circumferentially located at increments of greater than about 1.2 degrees.

6. The blade pitch adjustment mechanism of claim 1, further comprising a key configured to mate with the keyway.

7. A rotor blade assembly, comprising:
  a hub having a rotational axis and an outboard wall parallel to the rotational axis;
  a pitch cylinder fixed to the hub and extending inboard with a first face exposed at the outboard wall, and a pitch plate positioned at the outboard wall and circumscribing the first face, wherein the first face is recessed inboard from the pitch plate;
  pitch slots spaced circumferentially and extending inboard from the first face;
  a blade sleeve fixed to a blade and positioned in the pitch cylinder with a second face located at the outboard wall;
  a blade slot extending inboard from the second face, wherein the blade slot is cooperative with each pitch slot of the pitch slots to form keyways, wherein each keyway of the keyways is formed at the each pitch slot when the blade slot is circumferentially aligned with the each pitch slot; and
  a key configured to be disposed in the keyway thereby fixing the blade sleeve to the pitch cylinder.

8. The rotor blade assembly of claim 7, wherein the blade slot comprises blade slots.

9. The rotor blade assembly of claim 7, wherein the keyway corresponds to a determined blade pitch; and the keyways are circumferentially located at increments of about 0.5 to 1.5 degrees.

10. The rotor blade assembly of claim 9, wherein the increments are about 1.0 degrees.

11. The rotor blade assembly of claim 7, further comprising a stop connected to the pitch cylinder proximate the first face, the stop holding the key in the keyway.

12. A method, comprising:
  adjusting a blade pitch in a rotor blade assembly comprising a hub having a rotational axis and an outboard wall parallel to the rotational axis, a pitch cylinder fixed to the hub and extending inboard from a first face, pitch slots spaced circumferentially and extending inboard from the first face, a pitch plate positioned at the outboard wall and circumscribing the first face, wherein the first face is recessed inboard from the pitch plate, a blade sleeve fixed to a blade and positioned in the pitch cylinder with a second face located with the first face, a blade slot extending inboard from the second face;
  rotating the blade sleeve until the blade slot is aligned with a first pitch slot of the pitch slots forming a first keyway corresponding to a first blade pitch; and
  fixing the blade at the first blade pitch by positioning a key in the first keyway.

13. The method of claim 12, further comprising testing the rotor blade assembly by rotating the rotor blade assembly with the first blade pitch.

14. The method of claim 12, wherein the rotor blade assembly comprises six or more blades.

15. The method of claim 12, further comprising:
  testing the rotor blade assembly by rotating the rotor blade assembly with the first blade pitch;
  removing the key from the first keyway;
  rotating the blade sleeve until the blade slot is aligned with a second pitch slot of the pitch slots thereby forming a second keyway corresponding to a second blade pitch;
  fixing the blade at the second blade pitch by positioning a key in the second keyway; and
  testing the rotor blade assembly by rotating the rotor blade assembly with the second blade pitch.

16. The method of claim 15, wherein the rotor blade assembly comprises six or more blades.

* * * * *